April 7, 1959 R. L. PLOUFFE, JR 2,881,256

PULSE COMMUNICATION SYSTEM

Filed July 8, 1955 3 Sheets-Sheet 1

INVENTOR
ROBERT L. PLOUFFE, JR.
BY Alfred C. Hill
AGENT

April 7, 1959 R. L. PLOUFFE, JR 2,881,256

PULSE COMMUNICATION SYSTEM

Filed July 8, 1955 3 Sheets-Sheet 2

INVENTOR
ROBERT L. PLOUFFE, JR.
BY Alfred C. Hill
AGENT

INVENTOR
ROBERT L. PLOUFFE, JR.
BY Alfred C. Hill
AGENT

United States Patent Office 2,881,256 Patented Apr. 7, 1959

2,881,256

PULSE COMMUNICATION SYSTEM

Robert L. Plouffe, Jr., Livingston, N.J., assignor to International Telephone and Telegraph Corporation, Nutley, N.J., a corporation of Maryland Application July 8, 1955, Serial No. 520,860

13 Claims. (Cl. 179—15)

This invention relates to time division multiplex pulse communication systems.

In a time division pulse multiplex system, a time is divided into repeated and sequential equal periods referred to as frame periods, or system repetition periods, therefore, being a constant frame repetition frequency. Each of these periods is divided into a number of equal smaller time intervals each assigned to a different channel, the channel intervals being repeated at the frame repetition frequency. One of the channels is used for a synchronizing signal, such as for example, a double pulse or a pulse of different width from that of the other channels, and the other intervals are used for signal pulses. The signal pulses may be modulated, for example, in amplitude, width or time. In time modulation, the position of a pulse in its channel interval is determined by the instantaneous value of the amplitude of the signal being sent and the degree of variation is limited so that the pulses in any particular channel do not move outside their assigned channel interval.

At a receiving portion of the system, the synchronizing pulses are separated from the channel pulses by virtue of their different characteristics, such as width or double pulse characteristic, and are employed to generate in the receiving portion for each channel, gating pulses coincident and coextensive with the channel period. These pulses condition the demodulating apparatus to respond selectively to the signal pulses corresponding to that channel.

One practical way of deriving the division of the repetition period into the channel intervals has been accomplished by generating a wave of constant repetition frequency in a stable oscillator and applying the output thereof to a delay line having equally spaced output taps therealong, the output from the taps being timed to occur at the midpoints of the channel time interval. It has been discovered in practice that changes in components of the delay line due to temperature variations, and the like, cause a change in the time spacing between adjacent channels and the length of the sum of all the channel intervals. As a result one frame period may run into another and overlap, or gaps may develop between adjacent periods. Such overlapping introduces undesirable timing errors, and gaps between succeeding frames are undesirable as they interfere with timing tolerances.

It is desirable to have a time division multiplex system wherein each of said channel intervals be a fixed and predetermined fraction of the repetition frequency period regardless of variations in the delay line length. If this desirable feature is achieved, timing errors due to changes in delay line length will be substantially eliminated. The copending application of R. W. Hughes, filed July 8, 1955, Serial No. 520,895, entitled "Pulse Communication System," provides a portion of the solution. In accordance with this copending application, the time interval between adjacent delay line taps, the channel interval, is made proportional to a constant fraction of the repetition frequency period. This is accomplished by employing a phase shift type oscillator unit wherein at least a portion of the delay line is the phase shifting or frequency determining element thereof. Thus, the output from a selected one of the delay line taps having a given phase relationship is fed back to the appropriate point in an amplifier stage to develop an oscillation at the repetition frequency. Any changes in the components of the delay line will alter the electrical length of the delay line and correspondingly alter the repetition frequency, provided the change in the delay line is the same throughout, such as occurs during a temperature change.

The employment of the timing signal source of the above said copending application provides a proportional time division multiplex signal at the transmitter portion wherein the channels are separated by a constant predetermined fraction of the repetition frequency period. To provide a proportional system, that is proportional timing signals at the transmitting and receiving portions, it is necessary to provide a means at the receiving portion not only to synchronize the frequency of the generation of the gating pulses but also to alter the timing thereof for coincidence with the channel time intervals of the received pulse train. There may be a radical difference between the spacing of the intervals of the received pulse train and the unaltered delay line timing output since the demodulating equipment does not necessarily experience the same component change as was experience at the modulating equipment. Thus, if the total time delay of the modulation delay line was decreased by a change of component values, it is necessary to cause a substantially identical decrease in the total time delay of the demodulation delay line.

Therefore, it is an object of this invention to provide a proportional channel time division multiplex system wherein the timing signal delay line of the demodulator and modulator produce channel intervals which are coincident in time and frequency.

Another object of this invention is to provide a time division multiplex system that will eliminate the need for factory and field adjustment of the time positions of the channel signal pulses or channel selecting signals generated respectively in the modulation and demodulation equipment.

Still another object of this invention is to provide a means in the demodulator of a time division multiplex system to produce a control signal operable on the delay line timing signal distributor therein to provide said delay line with the same total time delay as is present in the delay line timing signal distributor at the modulator for the proportional generation of selecting or gating pulses.

A further object of this invention is to provide an improved timing signal source capable of generating equal timing signals each proportional to a given fraction of the repetition frequency of the timing signal source.

A feature of this invention is the provision of a timing signal source having a delay line distributor in the modulator wherein the equal time spacing between adjacent channel pulses is a predetermined fraction of the repetition frequency period regardless of changes in electrical length of said delay line and a timing signal source at the demodulator having a delay line distributor including a means to control the electrical length of the delay line for adjustment of the time interval between the adjacent channel selecting pulses for time coincidence with the time intervals of the modulator delay line.

Another feature of this invention is the provision of a phase discriminator disposed in the demodulator for comparing the phase difference between the synchronizing signal sent from the transmitting equipment and a selected signal produced in the demodulator timing signal source. The discriminator produces a control signal in accordance with the phase difference to change the inductance value of the inductors of the delay line for achievement of time coincidence between the time spacing of the received pulses and the time spacing of the gating pulses.

A further feature of this invention is the provision of an improved delay line oscillator timing signal source wherein the total length of the delay line is substantially the only frequency determining element of the oscillator, the phase shift of the amplifier tube being cancelled by means of employing a transformer of proper phase relationship for coupling voltages from the amplifier tube to the input of the delay line.

The above mentioned and other features and objects of this invention will become more apparent by reference to the following description taken in conjunction with the accompanying drawing, in which.

Figure 1A:
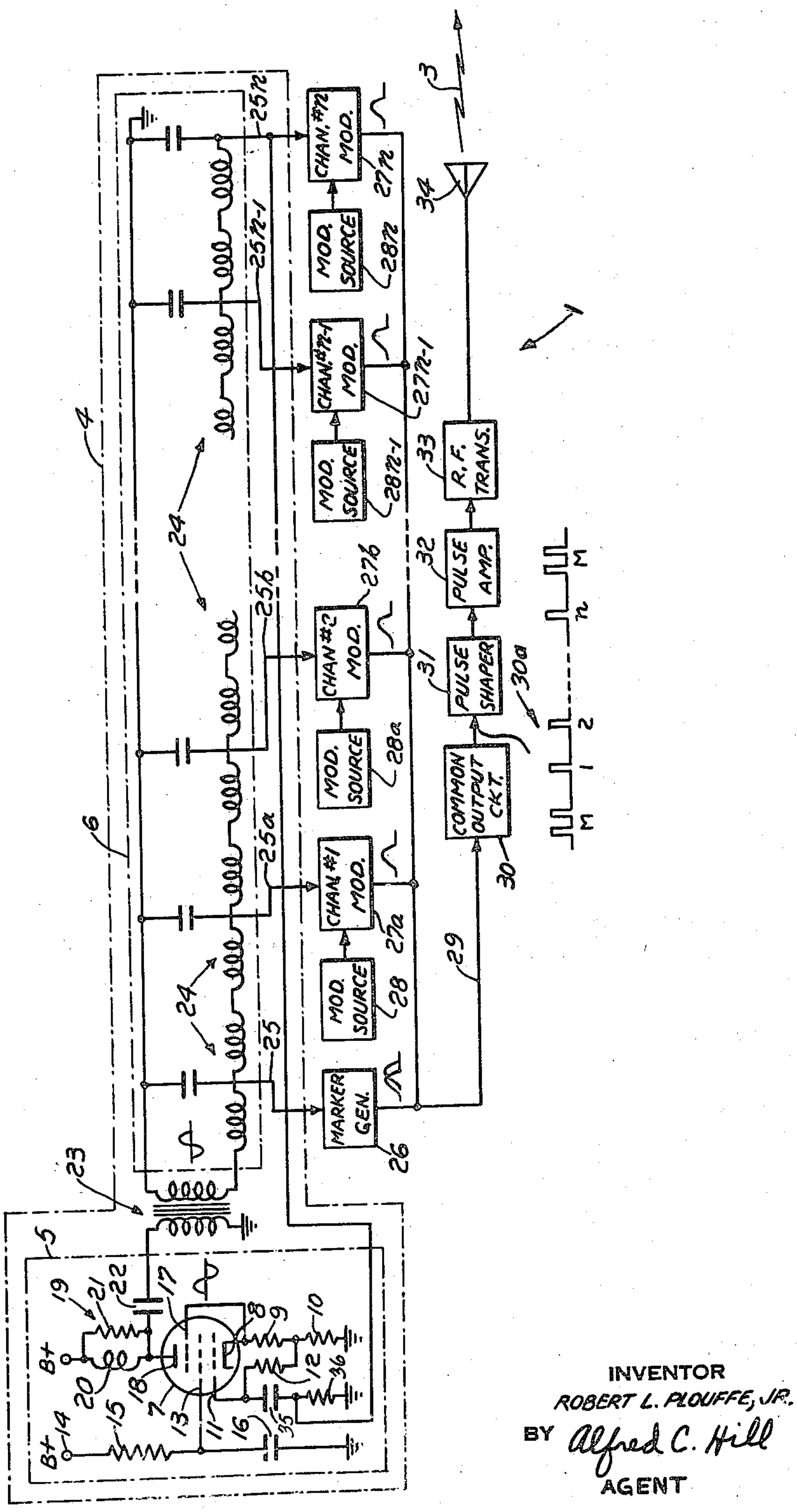
Figs. 1A and 1B are a schematic diagram, partially in block form, of a type of pulse communication system employing the principles of this invention.
Figure 1B:
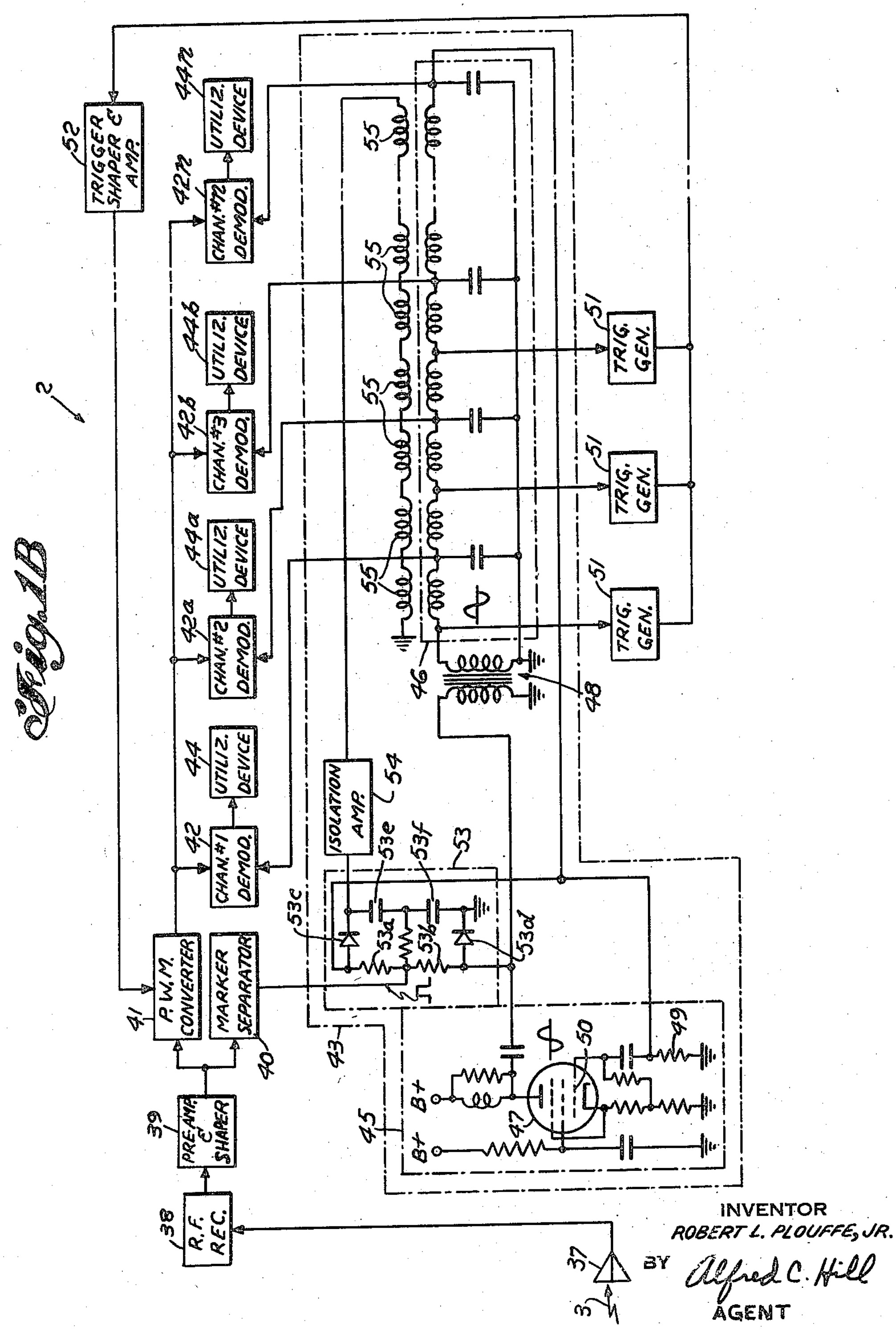

Referring to Figs. 1A and 1B of the drawing, there is illustrated therein a pulse communication system employing a source of sine wave signals recurrent at a predetermined repetition frequency, which signals are coupled from a plurality of time spaced outputs for coupling to a synchronizing signal generator and to a plurality of channel modulators for generating from the sine wave signals corresponding pulse signals. The system of Figs. 1A and 1B includes a multiplexer 1 and a demultiplexer 2 including therein a timing signal source following the principles of the above cited copending application, an improvement of which will be discussed hereinafter. Equipments 1 and 2 are connected by means of a transmission path 3, illustrated to be a radio communication path, but may be a wire transmission or other path.

Multiplexer 1 is shown to comprise a timing signal source 4 including an amplifier 5 and a delay line 6. Amplifier 5 includes electron discharge device 7 interconnected with delay line 6 as a phase shift oscillator. Device 7 is illustrated herein to be of the pentode type but of course may be of the triode type. Cathode 8 of device 7 is returned to ground by means of bias resistors 9 and 10 and control grid 11 is coupled to the junction of resistors 9 and 10 by means of resistor 12 to establish an appropriate bias on grid 11 for the oscillatory operation of device 7. To cooperate in this oscillatory operation, screen grid 13 is biased to a predetermined value by the voltage coupled from a regulated B+ voltage source applied at terminal 14 through dropping resistor 15. Condenser 16 provides an RF bypass for screen grid 13. The suppressor grid 17 is connected to cathode 8. The anode 18 of device 7 is coupled through the B+ voltage source by means of a shunt feeding arrangement 19 including inductance 20 and resistor 21 connected in parallel. The sine wave output of device 7 is coupled from anode 18 by means of condenser 22 and transformer 23 to the input of delay line 6.

Delay line 6 includes a plurality of equal delay sections 24, equal in number to the number of desired time divisions or channel intervals. The voltages existing at the output taps 25 represent the desired timing signals for generating equally spaced channel signals. The signal outputs of taps 25 are a plurality of sine wave signals for action thereon by marker generator 26 and channel modulators 27 to form from the sine wave signals channel pulses and a synchronizing pulse as described in detail in my copending application, filed June 6, 1955, Serial No. 513,468, entitled "Pulse Communication System." As disclosed in my copending application the marker generator and channel modulators include in a predetermined arrangement a half wave rectifier and a time constant circuit to produce from the sine wave signal a rectified output waveform having a sharp transition at the trailing edge thereof. In the case of the marker generator a parallel circuit is employed in conjunction with a phase shift element to provide two rectified outputs therefrom displaced in time. It is further taught in my copending application that signals applied from modulation sources 28 cause the sharp transition of the rectified outputs to vary in accordance with the ampltiude of the modulation signal. The rectified outputs from the marker generator 26 and the modulators 28 are coupled by means of conductor 29 to a common output circuit which differentiates the rectified signals to form a narrow pulse signal coincident in time with the sharp transition of the rectified waves. The common output circuit 30 further interleaves the produced pulses, as illustrated by waveform **30*a*, for application to the transmitting equipment including pulse shaper 31, pulse amplifier 32 and RF transmitter 33, the resultant radio frequency pulses being radiated from antenna 34, through the propagation medium 3**.

In accordance with the above-mentioned copending application of R. W. Hughes the timing signal source employs a signal from a selected one of taps 25 for feeding back to the amplifier 5 to establish the desired repetition frequency. In this copending arrangement the phase shift in the oscillatory loop was contributed by the amplifier tube and the delay line. The embodiment illustrated in Figs. 1A and 1B of timing signal source 4 couples the signal from the last tap of delay line 6, tap **25*n*, through condenser 35 to control grid 11. The resistor 36 functions as the terminating resistor of delay line 6. By incorporating transformer 23, selecting the length of delay line 6 for the desired initial repetition frequency, and taking the feedback signal from tap 25*n*, the delay line 6 not only functions to distribute the channel forming or timing pulses but also is the sole frequency determining element of the timing signal source 4. Thus, the necessary 360° phase shift for oscillation is provided solely by delay line 6**, as will be seen from the following.

The value of having the repetition frequency dependent on delay line 6 is that any change in the component values thereof will not change the ratio between the repetition frequency period and the time interval between adjacent ones of taps 25. If the repetition frequency should change due to changes in the electrical length of delay line 6, then the timing error which is created is distributed over all of the channel portions equally thereby maintaining the desired ratio. If all of the delay line sections 24 should change an equal amount, as in the case of a temperature change, then the time spacing between taps 25 will still be exactly the repetition period divided by the number of channels.

In order to insure that delay line 6 is the only frequency determining element, it is important that none of the other circuit elements contribute any phase shift. The primary phase shift contributed by other circuit elements takes place in electron discharge device 7. In accordance with the improvement herein in the timing signal source 4, the phase shift of device 7 is nullified by utilizing transformer 23 which is connected into the circuit in a manner to invert the phase of the signal at anode 18 of device 7 so that only the full length of delay line 6 determines the repetition frequency. Transformer 23 further functions to match relay line 6 to the anode impedance of device 7. This is necessary in order to allow sufficient loop gain for oscillation.

In order to insure that transformer 23 does not contribute any phase shift to the circuit other than the intentional 180°, it is necessary to design the transformer so that its upper and lower 3 db attenuation points are located an equal number of octaves from the repetition frequency of the system which for one actual reduction to practice was 15 kc. It is relatively simple to control the lower 3 db frequency point by winding for a specified inductance. However, it is more difficult to control the upper 3 db frequency point because this is a function of the transformer leakage inductance. Since, in the absence of any cancelling phase shift due to lower frequency cutoff, a high frequency cutoff located 5 octaves from the desired frequency produces 1.8° of phase shift at the desired frequency, then it is necessary to use a transformer with the widest bandwidth possible. The transformer designed for the reduction to practice uses a nickel-iron alloy, one mil tape, toroidal core. The bandwidth obtained is 11 octaves. The design is such that 5.5 octaves fall on each side of the 15 kc. point. Therefore, the phase shift at 15 kc. due to either the leading or lagging components is only 1.25°, and in the presence of both components the phase shift is zero. This may be thought of as a cancelling process where 1.25° phase shift lag is used to cancel the 1.25° phase shift lead. Thus a small error in either will result in a negligible small error in the resultant phase. Since obtaining a large bandwidth in the transformer is dependent on low leakage reactances, it is necessary to use the highest permeability possible for the magnetic core. For this reason, it is necessary to avoid D.C. anode current in the transformer primary. Therefore, capacitive coupling is employed as represented by condenser 22. In addition to capacitive coupling, a low Q tuning means (not shown) may be employed so as to remove any possible distortion in the output sine wave. This distortion if any, would be present as a result of the voltage driving the grid of the oscillator. The distortion can be reduced to a negligible amount by controlling the amplitude of the voltage driving grid 11.

The energy radiated from antenna 34 is received by antenna 37 for application thereof to receiver 38. In receiver 38 the pulse train is detected for application to the input of demultiplexer 2 which includes a preamplifier and shaper 39 wherein the pulse train is reshaped and conditioned to be in substantially the same condition as it was prior to the transmission. The output of shaper 39 is coupled to a marker separator 40 and pulse width modulation (PWM) converter 41 in parallel. Separator 40 removes the synchronizing signal from the pulse train which is employed for frequency synchronization between terminals 1 and 2. Converter 41 is employed to convert the individual channel signals of the pulse time modulation (PTM) type into corresponding pulse width modulated signals. The conversion taking place in converter 41 is accomplished through the aid of trigger signals generated in the timing signal source of demultiplexer 2 in a known manner. The output of converter 41 is applied to all of the channel demodulators 42 wherein channel selecting gates of the timing signal source 43 cooperate to separate the individual channel signals in proper time relationship from the pulse train and the intelligence carried by the channel signals is recovered for utilization in devices 44.

As in multiplexer 1 the heart of demultiplexer 2 includes the timing signal source 43 which comprises an amplifier 45 and a delay line 46. Amplifier 45 includes an electron discharge device 47 having coupled thereto substantially the same circuitry as described in connection with amplifier 5 of multiplexer 1 and has the same function as described in connection therewith. The oscillatory output of amplifier 45 is coupled through transformer 48 which functions as discussed in connection with transformer 23 of multiplexer 1. The sine wave input to delay line portion 46 is applied to the plurality of delay sections having taps in conjunction therewith, said sections and said taps being equal in number to the desired number of gating signals which is equal in number to the channels. As in connection with delay line 6, the output of delay line 46 is terminated by resistor 49 and the signal at the last tap or delay section of portion 46 is fed back to grid 50 of device 47 to complete an oscillator feedback loop. The amplifier 45 and delay line 46 of source 43 are interdependent and function in substantially the same manner as hereinabove described in connection with source 4 to provide a plurality of channel selecting gates having a time spacing therebetween which is constantly maintained at a given fraction of the repetition frequency period.

In addition to the normal selecting gate taps there is disposed along 46 another set of taps intermediate the selecting gate taps to distribute timing signals from the delay line to a plurality of trigger generators 51 for generation of sequentially timed trigger pulses which are applied through shaper amplifier 52 for action in converter 41 wherein the selectively timed trigger pulses are utilized to sequentially convert the PTM channel signals into corresponding PWM signals for demodulation purposes.

To fulfill the attainment of a proportional signal there is provided at demultiplexer 2 a means to adjust the electrical length of delay line 46 for coincidence with the electrical length of delay line 6. By adjusting the electrical length of delay line 46 the selecting gate signals and trigger signals generated by line 46 are placed in phase coincidence with the channel signals generated by line 6 of multiplexer 1. This necessary adjustment to achieve a proportional pulse communication system is provided by employing phase discriminator 53 to measure the phase difference between the output of separator 40, a signal representative of the synchronizing signal generated in multiplexer 1, and a selected signal of timing signal source 43, shown herein to be the output of amplifier 45 and the output of delay line 46. These outputs are 180° out of phase and separately add to the out put of separator 40 in resistors **53*a* and 53*b*, respectively. The separately added components are applied respectively to diodes 53*c* and 53*d* for peak detection in cooperation with condensers 53*e* and 53*f*. the D.C. voltages across condensers 53*e* and 53*f* are added and provide the output of discriminator 53 which is employed to control the inductance value of all of the inductors present in delay line 46. The D.C. voltage output of discriminator 53 is coupled through isolating amplifier 54 to control windings 55 connected in a series circuit arrangement and in coupling relation with the inductors of delay line 46. The D.C. current flowing through windings 55 will adjust the inductance value of the inductors thereby electrically lengthening or shortening delay line 46 as is dictated by the output of discriminator 53. In the phasing system illustrated herein, any difference in electrical length between delay lines 6 and 46 that must be corrected by the discriminator output will be indicated by the phase difference between the synchronizing signal and the selected oscillatory signal of source 44. It is preferred that there be no phase difference between these two voltages, or in any event any phase difference which exists must be highly stable. Since it is necessary to use a D.C. amplifier in the inductor control circuit, it is unlikely that the phase difference can be made highly stable. Therefore, the automatic means for reducing the phase difference to zero including discriminator 53 is employed wherein the output thereof is a measure of the phase difference, a zero output being indicative of a zero phase difference. When the phase difference goes to zero the electrical length of delay line 46 is then substantially identical to the electrical length of delay line 6 thereby establishing phase or time equality between the transmitted channel intervals and the channel intervals at demultiplexer 2.**

The system of Figs. 1A and 1B employ a timing signal source arrangement which generates sine wave signals at predetermined time intervals and are acted upon by special types of marker generator and channel modulators for producing therefrom pulse signals having the desired characteristics for PTM communication. The proportional multiplex system arrangement disclosed in this specification is not limited to sine wave type timing signal sources but may be incorporated in pulse type timing signal sources.

Figure 2:
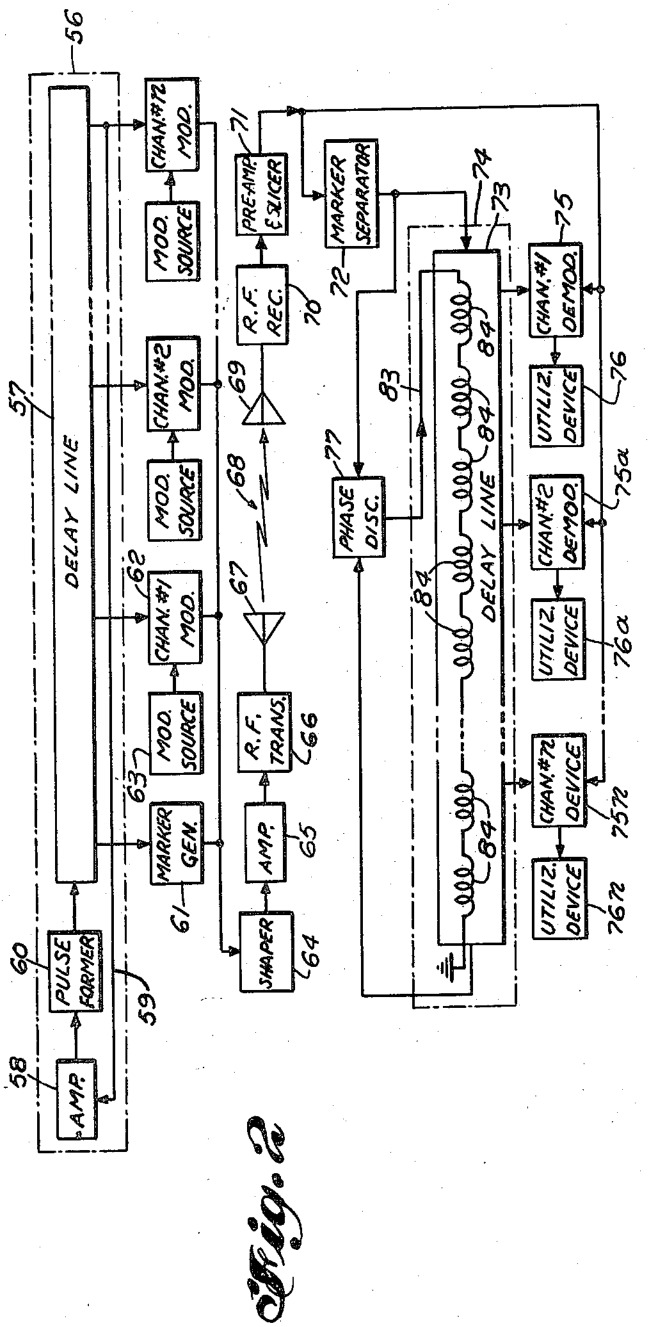
Fig. 2 is a schematic diagram, partially in block form, of another type of pulse communication system employing the principles of this invention.

Referring to Fig. 2, there is illustrated therein a communication system employing pulse signal timing sources for utilization in PTM communication of the time division multiplex type and a proportional system arrangement of the type described in connection with Figs. 1A and 1B. As in the system of Figs. 1A and 1B, the timing signal source 56 includes a delay line 57 and amplifier 58 and an oscillatory feedback path 59 connected between the last timing signal tap disposed along line 57 and amplifier 58. The remainder of the feedback loop includes a pulse forming network 60 which operates upon the oscillatory output of amplifier 58 to form therefrom pulses occurring at a repetition frequency established by the electrical length of delay line 57. As in the previous embodiment, delay line 57 is the sole frequency determining element of the timing signal source 56 by incorporating a transformer at the input to delay line 57. The transformer is designed so that it will cancel any phase shift that may occur in other elements of the feedback loop other than the desired phase shift occurring in the frequency determining element, delay line 57.

The time interval between adjacent delay line taps will be maintained at a predetermined fraction of the repetition frequency period by the arrangement of source 56 for the reasons set forth in the description of Figs. 1A and 1B relative to source 4. These channel timing pulses are coupled to their respective marker generators and channel modulators for production of a pulse train signal including a marker or synchronizing signal and a plurality of time interleaved channel pulses modulated by varying a characteristic thereof in accordance with the modulating signal of the modulation sources associated with each of the channel modulators. The produced pulse train signal is shaped in shaper 64 and amplified in amplifier 65 prior to application to the RF transmitter for propagation from antenna 67 along path 68 to the receiving antenna 69. The received signal is operated upon by receiver 70 for detection of the pulse train signal which is amplified and sliced in amplifier and slicer 71 prior to coupling to the demodulation portion of the demultiplexer.

The output of slicer 71 is coupled through two parallel paths, one of said paths including marker separator 72 for the extraction of the synchronizing signal from the pulse train signal. The pulse output of separator 72, representative of the synchronizing signal, is coupled to the input of delay line 73 which forms the demodulation timing signal source 74. The pulse output of separator 72 is propagated down delay line 73 and extracted therefrom at successive time intervals for application to the channel demodulators 75. The second parallel path from slicer 71 couples the pulse train to each of the channel demodulators 75 wherein the output of the delay line tap cooperate to separate the corresponding channel signal from the pulse train for recovery of the intelligence therein for utilization in devices 76.

Figure 3:
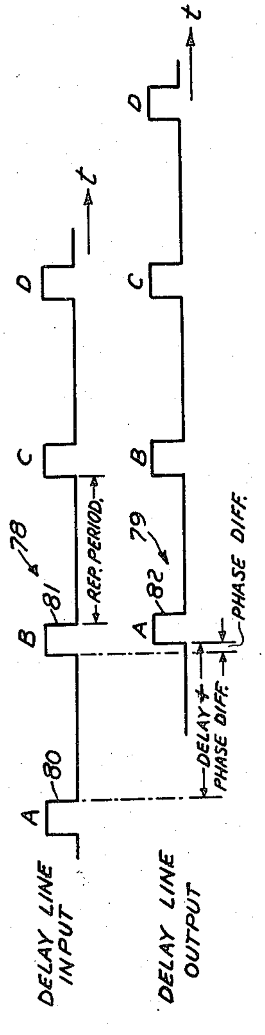
Fig. 3 is a set of curves useful in explaining the operation of the system of Fig. 2.

To accomplish a phase coincidence between the channel pulse outputs of delay line 57 and the selecting signal outputs of delay line 73, the output of marker separator 72 is coupled to phase discriminator 77 for comparison with a selected signal in timing source 74. In accordance with this embodiment, the selected signal of source 74 is coupled from the output of delay line 73 for application to discriminator 77. Referring to Fig. 3, there is illustrated therein curves 78 and 79, the input to delay line 73 and the output of delay line 73, respectively, each of which are applied to phase discriminator 77. Let us assume that pulse 80 is applied to the input of delay line 73 and simultaneously applied to phase discriminator 77. At this instant of time, assuming the system is just starting operation, there will be no output at delay line 73 since the delay line 73 has a time delay substantially equivalent to the period of the initial system repetition frequency, which is the same as the initial repetition frequency of the synchronizing signal. The next succeeding pulse of curve 78, pulse 81, will be applied in parallel to the input of delay line 73 and phase discriminator 77. At substantially this same instance of time the delayed counterpart of pulse 80 will be coupled to phase discriminator 77, the delayed counterpart represented in Fig. 3 by pulse 82. Discriminator 77 operates to compare the phase difference between pulses 81 and 82, error therein resulting in a D.C. voltage which is coupled by means of conductor 73 through the series connected control windings 84 which are disposed in coupling relation to the inductors of delay line 73. The amount of current flowing through control windings 84, proportional to the phase difference between the input and output of delay line 73, adjusts the inductance value of the inductors of delay line 73 the amount necessary to cause coincidence between the electrical length of delay line 57 and delay line 73. This adjustment of delay line length establishes equality between the channel intervals of delay line 57 and delay line 73.

While I have described above the principles of my invention in conjunction with specific apparatus, it is to be clearly understood that this description is made only by way of example and not as a limitation to the scope of my invention as set forth in the objects thereof and in the accompanying claims.

I claim:

1. A combined oscillator and timing signal distribution unit comprising a source of synchronizing signal, an amplifier and a delay line, said delay line having a plurality of timing signal output taps therealong with given successive time intervals therebetween, means coupling the output of said amplifier to the input of said delay line, means coupling a selected one of said output taps to the input of said amplifier to provide an oscillation feedback path, said delay line, between the input thereof and said selected output tap, being the frequency determining element for the oscillation therein thereby maintaining a substantially constant fraction of the oscillation frequency period between the outputs of adjacent ones of said output taps regardless of variations in oscillation frequency, a phase discriminator coupled to the output of said amplifier and the output of said source of synchronizing signal to develop a control signal proportional to the phase difference between the output signal of said amplifier and the output signal of said source of synchronizing signal, and a control means in coupling relation with said delay line responsive to said control signal to vary the length of said delay line to establish and maintain frequency synchronization and a fixed phase relationship between the synchronizing signal and the output signal of said amplifier.

2. A unit according to claim 1, wherein said delay line between the input thereof and said selected output tap has an electrical length of substantially 360° at the oscillation frequency and said amplifier includes means having a given phase shift and said means coupling the output of said amplifier to said delay line includes means having a phase shift of sufficient magnitude to cancel said given phase shift.

3. A unit according to claim 1, wherein said amplifier includes an electron discharge device having at least an anode, a cathode and a control grid, a reference potential, means coupling said cathode to said reference potential, a source of anode voltage, and an anode load circuit coupled between said anode and said source of anode voltage and said means coupling the output of said amplifier to said delay line includes said anode load circuit and a transformer having a primary winding and a secondary winding, said primary winding being coupled between the anode of said discharge device and said reference potential and said secondary winding being coupled across the input of said delay line, said primary winding and said secondary winding being poled to provide a phase shift therein to cancel the phase shift of said discharge device.

4. A combined oscillator and timing signal distribution unit comprising a source of synchronizing signal, an amplifier and a delay line, said delay line having a plurality of timing signal output taps therealong with given successive time intervals therebetween, means coupling the output of said amplifier to the input of said delay line, means coupling a selected one of said output taps to the input of said amplifier to provide an oscillation feedback path, said delay line, between the input thereof and said selected output tap, being the frequency determining element for the oscillation therein thereby maintaining a substantially constant fraction of the oscillation frequency period between the outputs of adjacent ones of said output taps regardless of variations in oscillation frequency, a phase discriminator coupled to the output of said amplifier and the output of said source of synchronizing signal to develop a control signal proportional to the phase difference between the output signal of said amplifier and the output signal of said source of synchronizing signal, and a control means in coupling relation with said delay line responsive to said control signal to vary the length of said delay line to establish and maintain frequency synchronization and a fixed phase relationship between the synchronizing signal and the output signal of said amplifier, said delay line including a plurality of delay sections, each of said sections including an inductor in series relation with the signal coupled to said delay line and a capacitor in shunt relation with the signal coupled to said delay line and said control means including a plurality of series connected control windings coupled to the output of said phase discriminator and disposed in inductance controlling relation to the inductors of said delay line.

5. In timing signal distribution units, a source of synchronizing signal, a delay line, said delay line having a plurality of timing signal output taps therealong with given successive time intervals therebetween, means coupling the output of said source of synchronizing signal to the input of said delay line, a phase discriminator, means coupling the output of said source of synchronizing signal to said phase discriminator, means coupling the output of said delay line to said phase discriminator, said phase discriminator developing a control signal proportional to the phase difference between the output signal of said delay line and the synchronizing signal of said source of synchronizing signal, and a control means in coupling relation with said delay line responsive to said control signal to vary the length of said delay line to establish a fixed phase relationship between the synchronizing signal and the output signal of said delay line regardless of variations in the frequency of the signals of said source of synchronizing signals.

6. In communication systems of the time division multiplex type; a transmitting portion comprising a combined oscillator and timing signal distributor unit, said unit including an amplifier and a delay line, the delay line having a plurality of output taps therealong with given successive time intervals therebetween for timing signal distribution, means coupling the output oscillations of said amplifier to the input of said delay line, and means coupling the most remote one of said output taps from the input of said delay line to the input of said amplifier, said delay line being the frequency determining element for said unit thereby maintaining a substantially constant fraction of the oscillation frequency period between the signal outputs of adjacent ones of said output taps regardless of variations in oscillation frequency; a synchronizing signal generator coupled to one of said output taps for generating a synchronizing signal; a plurality of modulators coupled to other of said output taps to provide a plurality of communication channels; output means common to said synchronizing signal generator and said modulators to produce from the outputs thereof a synchronizing signal and a plurality of communication channel signals and to accomplish a time interleaving thereof; means coupled to said output means to shape and amplify said interleaved signals; and radio frequency means coupled to said shaping and amplifying means to accomplish a transmission of said interleaved signals to a distant demodulation terminal.

7. A system according to claim 6, wherein said delay line has an electrical length of substantially 360° at the oscillation frequency and said amplifier includes means having a given phase shift and said means coupling the output of said amplifier to the input of said delay line includes means having a phase shift of sufficient magnitude to cancel said given phase shift.

8. A system according to claim 6, wherein said amplifier includes an electron discharge device having at least an anode, a cathode and a control grid, a reference potential, means coupling said cathode to said reference potential, a source of anode voltage, and an inductive circuit coupled between said anode and said source of anode voltage and said means coupling the output of said amplifier to the input of said delay line includes a transformer having a primary winding and a secondary winding, said primary winding being coupled between the anode of said discharge device and said reference potential and said secondary winding being coupled across the input of said delay line, said primary winding and said secondary winding being poled to provide a phase shift therein to cancel the phase shift of said discharge device.

9. In communication systems of the time division multiplex type; a receiving portion for recovery of intelligence from time interleaved signals including a synchronizing signal and a plurality of communication channel signals comprising a means to receive said time interleaved signals; means coupled to said receiving means to amplify and shape said time interleaved signals; a plurality of demodulator circuits, one for each communication channel; means coupled to said amplifying and shaping means to couple said time interleaved signals to said demodulator circuits; signal selection means coupled to said amplifying and shaping means to select said synchronizing signal from said time interleaved signals; a combined oscillator and timing signal distributor unit including an amplifier and a delay line, the delay line having a plurality of output taps therealong with given successive time intervals therebetween, means coupling the output of said amplifier to the input of said delay line, means coupling a selected one of said output taps to the input of said amplifier, said delay line portion between the input thereof and said selected output tap being the frequency determining element for the oscillations of said unit thereby maintaining a substantially constant fraction of the oscillation frequency period between the outputs of adjacent ones of said output taps regardless of variations in oscillation frequency; means coupling the signal at said output taps to respective ones of said demodulator circuits for channel separation and intelligence recovery; a phase discriminator coupled to the output of said amplifier and the output of said signal selection means to develop a control signal proportional to the phase difference between the output signal of said amplifier and the output signal of said signal selection means; and a control means in coupling relation with said delay line responsive to said control signal to vary the length of said delay line to establish and maintain frequency synchronization and a fixed phase relationship between the synchronizing signal and the output signal of said amplifier.

10. A system according to claim 9, wherein said delay line has an electrical length of substantially 360° at the oscillation frequency and said amplifier includes means having a given phase shift and said means coupling the output of said amplifier to the input of said delay line includes means having a phase shift of sufficient magnitude to cancel said given phase shift.

11. In communication systems of the time division multiplex type; a receiving portion for recovery of intelligence from time interleaved signals including a synchronizing signal and a plurality of communication channel signals comprising a means to receive said time interleaved signals; means coupled to said receiving means to amplify and shape said time interleaved signals; a plurality of demodulator circuits, one for each communication channel; means coupled to said amplifying and shaping means to couple said time interleaved signals to said demodulator circuits; signal selection means coupled to said amplifying and shaping means to select said synchronizing signal from said time interleaved signals; a combined oscillator and timing signal distributor unit including an amplifier and a delay line, the delay line having a plurality of output taps therealong with given successive time intervals therebetween, means coupling the output of said amplifier to the input of said delay line, means coupling a selected one of said output taps to the input of said amplifier, said delay line portion between the input thereof and said selected output tap being the frequency determining element for the oscillations of said unit thereby maintaining a substantially constant fraction of the oscillation frequency period between the outputs of adjacent ones of said output taps regardless of variations in oscillation frequency; means coupling the signal at said output taps to respective ones of said demodulator circuits for channel separation and intelligence recovery; a phase discriminator coupled to the output of said amplifier and the output of said signal selection means to develop a control signal proportional to the phase difference between the output signal of said amplifier and the output signal of said signal selection means; and a control means in coupling relation with said delay line responsive to said control signal to vary the length of said delay line to establish and maintain frequency synchronization and a fixed phase relationship between the synchronizing signal and the output signal of said amplifier, said delay line including a plurality of delay sections, each of said sections including an inductance in series relation with the signal coupled to said delay line and a capacitance in shunt relation with the signal coupled to said delay line and said control means including a plurality of series connected control windings coupled to the output of said phase discriminator and disposed in inductance controlling relation to the inductances of said delay line.

12. A communication system comprising a transmitting portion transmitting pulses including a synchronizing pulse signal each within a given channel interval and in which said channel intervals may vary in length and a receiving portion including means receiving said pulses, means separating said synchronizing pulse signal from said pulses and a combined oscillator and timing signal distribution unit including an amplifier and a delay line, said delay line having a plurality of timing signal output taps therealong with given successive time intervals therebetween, means coupling the output of said amplifier to the input of said delay line, means coupling a selected one of said output taps to the input of said amplifier to provide an oscillation feedback path, said delay line, between the input thereof and said selected output tap, being the frequency determining element for the oscillation therein thereby maintaining a substantially constant fraction of the oscillation frequency period between the outputs of adjacent ones of said output taps regardless of variations in oscillation frequency, a phase discriminator coupled to the output of said amplifier and the output of said means separating to develop a control signal proportional to the phase difference between the output signal of said amplifier and the output signal of said means separating, and a control means in coupling relation with said delay line responsive to said control signal to vary the length of said delay line to establish and maintain frequency synchronization and a fixed phase relationship between said channel intervals and the outputs of said delay line.

13. In a system in which pulses including a synchronizing pulse signal are transmitted each within a given channel interval and in which said intervals may vary in length, a receiving portion including means receiving said pulses, means separating said synchronizing pulse signal from said pulses and a combined oscillator and timing signal distribution unit including an amplifier and a delay line, said delay line having a plurality of timing signal output taps therealong with given successive time intervals therebetween, means coupling the output of said amplifier to the input of said delay line, means coupling a selected one of said output taps to the input of said amplifier to provide an oscillation feedback path, said delay line, between the input thereof and said selected output tap, being the frequency determining element for the oscillation therein thereby maintaining a substantially constant fraction of the oscillation frequency period between the outputs of adjacent ones of said output taps regardless of variations in oscillation frequency, a phase discriminator coupled to the output of said amplifier and the output of said means separating to develop a control signal proportional to the phase difference between the output signal of said amplifier and the output signal of said means separating, and a control means in coupling relation with said relay line responsive to said control signal to vary the length of said delay line to establish and maintain frequency synchronization and a fixed phase relationship between said channel intervals and the outputs of said delay line.

References Cited in the file of this patent

UNITED STATES PATENTS

| | | |
|---|---|---|
| 2,451,858 | Mork | Oct. 19, 1948 |
| 2,506,329 | Ames | May 2, 1950 |
| 2,508,620 | Peterson | May 23, 1950 |
| 2,750,566 | Westcott et al. | June 12, 1956 |

OTHER REFERENCES

Proceedings of IRE, volumn 36 No. 9, September 1948 (pages 1096–1100).